United States Patent
Chang et al.

(10) Patent No.: US 7,978,954 B2
(45) Date of Patent: Jul. 12, 2011

(54) ROTATION SPEED CONTROL APPARATUS FOR DISK RECORDER AND METHOD THEREOF

(75) Inventors: He-Chi Chang, Taitung County (TW); Yi-Chun Lin, Taichung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1162 days.

(21) Appl. No.: 11/682,318

(22) Filed: Mar. 6, 2007

(65) Prior Publication Data

US 2007/0217766 A1 Sep. 20, 2007

(30) Foreign Application Priority Data

Mar. 7, 2006 (TW) .............................. 95107547 A

(51) Int. Cl.
*H04N 5/932* (2006.01)

(52) U.S. Cl. ...................................................... 386/222

(58) Field of Classification Search ............ 386/E5.068, 386/200, 231, 326–328, 222; 369/239; 360/73.01
See application file for complete search history.

(56) References Cited

U.S. PATENT DOCUMENTS

| | | | | |
|---|---|---|---|---|
| 5,659,799 A | * | 8/1997 | Wu et al. | 710/57 |
| 6,574,415 B2 | * | 6/2003 | Nakamura et al. | 386/241 |
| 6,901,039 B1 | * | 5/2005 | Sugie et al. | 369/47.28 |
| 2007/0153651 A1 | * | 7/2007 | Lin et al. | 369/47.32 |

FOREIGN PATENT DOCUMENTS

| | | | |
|---|---|---|---|
| JP | 06-231467 | * | 8/1994 |
| JP | 07-147663 | * | 6/1995 |
| JP | 2002-024087 | * | 1/2002 |

OTHER PUBLICATIONS

Takada et al., Machine generated translation of JP 2002-024087, Jan. 2002.*
Kawakami et al, Machine generated translation of JP 06-231467, Aug. 1994.*

* cited by examiner

*Primary Examiner* — David E Harvey
(74) *Attorney, Agent, or Firm* — Jianq Chyun IP Office

(57) ABSTRACT

A rotation speed control apparatus for a disk recorder is provided, which includes a buffer monitor and a rotation speed decision maker. According to the amount of data in the buffer, the buffer monitor outputs a buffer data. According to the buffer data, the rotation speed decision maker outputs a disk-rotation-speed signal. According to the disk-rotation-speed signal, the disk recording speed of an optical storage system is adjusted by the rotation speed control apparatus to avoid disk recording interruption due to lack of buffer data.

16 Claims, 3 Drawing Sheets

ROTATION SPEED CONTROL APPARATUS FOR DISK RECORDER AND METHOD THEREOF

CROSS-REFERENCE TO RELATED APPLICATION

This application claims the priority benefit of Taiwan application serial no. 95107547, filed Mar. 7, 2006. All disclosure of the Taiwan application is incorporated herein by reference.

BACKGROUND OF THE INVENTION

1. Field of Invention

The present invention relates to an apparatus for controlling an optical storage system, and more particularly, to a disk recording control apparatus for controlling the rotation speed of a spindle motor to avoid the interruption of disk recording and a method thereof.

2. Description of Related Art

Generally speaking, the recording mode of an optical storage system for real-time recording, such as a Digital Video Disc (DVD) recorder or disk recorder, is mainly a Constant Linear Velocity (CLV) mode. That is, the recording process is carried out at a constant linear speed according to a disk recording speed set by a user, and disk recording interruption occurs when lacking buffer data.

FIG. 1A is a block diagram of an optical storage system according to the conventional art. Data is encoded by a video encoder 110 and then is transmitted to a buffer 132 via a bus 120 and temporarily stored therein. An encoder 134 reads the data from the buffer 132 and encodes the data, and then transmits the encoded data to a servo system 136. The disk recording process is carried out by the servo system 136. The data bit rate of the video encoder 110 in the DVD recorder may be different depending upon different compression ratio set by the user. Although, the data encoding speed may be different. In order to avoid an excessively low recording speed, the disk recording speed is generally set to be slightly higher than the encoding speed of the video encoder 110 in the DVD recorder. Therefore, the buffer under-run error often occurs due to lack of data in the buffer 132. When the error frequently occurs, the recording quality is poor, thereby influencing the playing quality after the disk is recorded.

In conventional art, to avoid excessively frequent interruptions, the capacity of the buffer is often increased to reduce the interruption errors. However, increasing the buffer capacity implies increasing the cost, which does not comply with the principle of cost effectiveness.

SUMMARY OF THE INVENTION

The present invention provides a disk recording control apparatus for adjusting the rotation speed of a spindle motor according to the change in the amount of data temporarily stored in the buffer so as to control the disk recording speed, thus avoiding disk recording interruptions.

The present invention provides a disk recording control apparatus for adjusting the rotation speed of a spindle motor according to the data flow of an Integrated Drive Electronics (IDE) bus so as to control the disk recording speed, thus avoiding disk recording interruptions.

The present invention provides a method for controlling disk recording, wherein the change in the amount of data in the buffer is detected and then the disk recording speed is adjusted accordingly, thus reducing the likelihood of disk recording interruptions.

The present invention provides a method for controlling disk recording, wherein the rotation speed of a spindle motor is adjusted according to the data flow of the bus, so as to control the disk recording speed, thus avoiding disk recording interruptions.

A rotation speed control apparatus for a disk recorder is provided by the present invention, which is suitable for adjusting the disk recording speed of an optical storage system. The optical storage system includes a bus, a buffer, a servo system, and a video encoder. The video encoder transmits the encoded data to the buffer to be temporarily stored therein via the bus, and the servo system carries out the disk recording process according to the data in the buffer. The disk recording speed of the optical storage system is adjusted in real time by the rotation speed control apparatus of the present invention, so as to avoid disk recording interruptions due to lack of the buffer data.

The rotation speed control apparatus of the present invention includes a buffer monitor and a rotation speed decision maker, wherein the buffer monitor is coupled to the buffer and outputs the buffer data according to the amount of data in the buffer; the rotation speed decision maker is coupled between the buffer monitor and the servo system and used for obtaining the amount of data in buffer and the changing of the amount of data and then outputting a disk-rotation-speed signal accordingly. The servo system adjusts the disk recording speed of the optical storage system according to the disk-rotation-speed signal.

In an embodiment, the above disk rotation speed control apparatus further includes a flow detector coupled between the bus and the rotation speed decision maker. The flow detector outputs a bus data bit rate according to the data transmission speed of the bus. The rotation speed decision maker further adjusts the disk-rotation-speed signal according to the change of the bus data bit rate.

In another embodiment of the present invention, the above rotation speed control apparatus is only consisted of the flow detector and the rotation speed decision maker. The flow detector detects the data transmission speed (i.e., data flow) of the bus, and then outputs a bus data bit rate. Then, a disk-rotation-speed signal is output. The servo system adjusts the disk recording speed of the optical storage system according to the disk-rotation-speed signal.

From another aspect, the present invention provides a method for controlling the rotation speed of a disk recorder, which is suitable for adjusting the disk recording speed of an optical storage system. The optical storage system includes a bus, a buffer, a servo system, and a video encoder. The video encoder transmits the encoded data via the bus to the buffer to be temporarily stored therein. The servo system carries out the disk recording process according to the data in the buffer. The disk recording speed of the optical storage system is adjusted in real time with the method for controlling the rotation speed provided by the present invention.

The method for controlling the rotation speed provided by the present invention includes the following steps. First, the buffer data is output according to the amount of data in the buffer. Next, a disk-rotation-speed signal is output according to the buffer data. Then, the servo system adjusts the disk recording speed of the above optical storage system according to the disk-rotation-speed signal.

In the above method for controlling rotation speed, the step of outputting the disk-rotation-speed signal further includes outputting a bus data bit rate according to the data transmission speed of the bus. The disk-rotation-speed signal is adjusted according to the bus data bit rate. Then, the servo system adjusts the disk recording speed of the optical storage system according to the disk-rotation-speed signal.

The disk recording interruption resulting from the lack of data in the buffer is avoided in the present invention through monitoring the amount of data in the buffer and adjusting the disk recording speed in real time, thus the quality and stability of disk recording are enhanced.

In order to make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
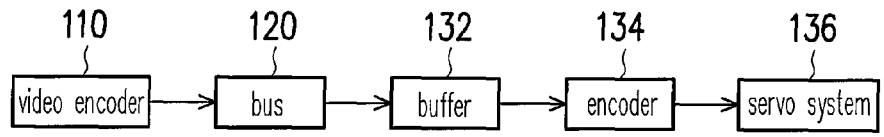
FIG. 1A is a block diagram of an optical storage system in the conventional art.
Figure 1B:
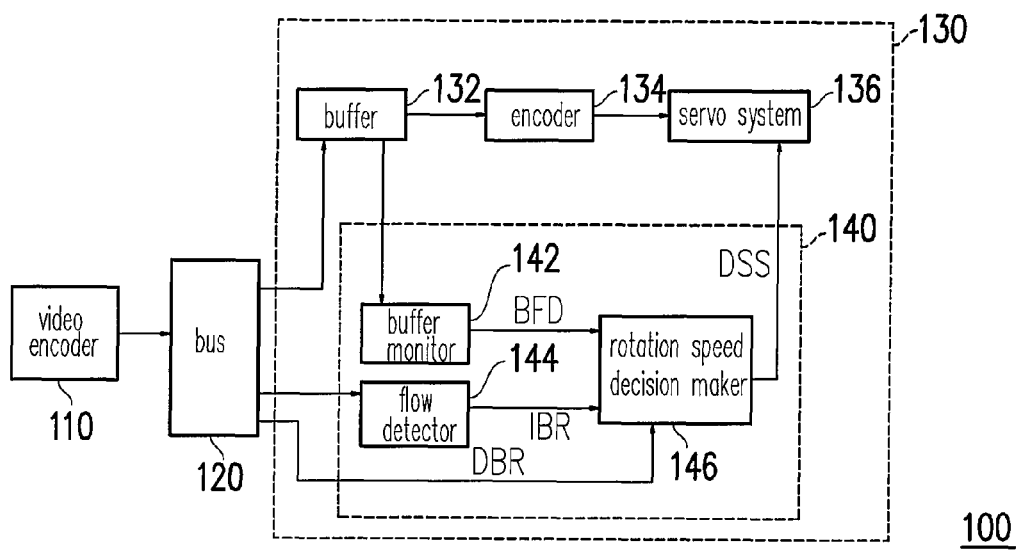
FIG. 1B is a block diagram of an optical storage system according to an embodiment of the present invention.

FIG. 1B is a block diagram of an optical storage system according to an embodiment of the present invention. The optical storage system 100 comprises a video encoder 110, a bus 120, and a disk recorder 130. The disk recorder 130 includes a buffer 132, an encoder 134, a servo system 136, and a rotation speed control apparatus 140. The rotation speed control apparatus 140 includes a buffer monitor 142, a flow detector 144, and a rotation speed decision maker 146.

The bus 120 is coupled between the video encoder 110 and the buffer 132 and transmits the data encoded by the video encoder 110 to the buffer 132 to be temporarily stored. The encoder 134, coupled between the buffer 132 and the servo system 136, encodes the data temporarily stored in the buffer 132, and then transmits the encoded data to the servo system 136 for disk recording.

The buffer monitor 142 is coupled between the buffer 132 and the rotation speed decision maker 146 for monitoring the amount of data temporarily stored in the buffer 132 and the change in the amount of the data, and thereby outputting a buffer data BFD to the rotation speed decision maker 146. The flow detector 144 is coupled between the bus 120 and the rotation speed decision maker 146 for detecting the data flow of the bus 120 and outputting a bus data bit rate IBR to the rotation speed decision maker 146 according to the data flow. The buffer monitor 142 and the flow detector 144 can be implemented by hardware or firmware, which may be easily known by those with ordinary skills in the field of the present invention through the disclosure of the present invention, and thus will not be described again.

The rotation speed decision maker 146 is further coupled between the bus 120 and the servo system 136 and outputs a disk-rotation-speed signal DSS to the servo system 136 according to the buffer data BFD and the bus data bit rate IBR. The servo system 136 adjusts the disk recording speed of the optical storage system 100 according to the disk-rotation-speed signal DSS. More particularly, in this embodiment, the servo system 136 adjusts the rotation speed of the spindle motor, which is in charge of the rotation of the disk, in the optical storage system 100 according to the disk-rotation-speed signal DSS, so as to adjust the disk recording speed.

In this embodiment, the bus 120 is an IDE transmission interface. The video encoder 110 has different data encoding speeds according to different compression ratios set by the user, so as to generate different data bit rates DBR. The data bit rate DBR is transmitted to the rotation speed decision maker 146 via the bus 120. The interface for transmitting the data bit rate DBR between the rotation speed decision maker 146 and the video encoder 110 can be achieved by the protocol of Advanced Technology (AT) attachment packet interface (referred as ATAPI for short). The rotation speed decision maker 146 adjusts the disk-rotation-speed signal DSS according to the data bit rate DBR. Meanwhile, the servo system 136 provides the disk recording speed of the optical storage system 100 with an initial value according to the disk-rotation-speed signal DSS.

During the disk recording process carried out by the optical storage system 100, the buffer monitor 142 monitors the amount of data in the buffer 132 and the change in the amount of the data in the buffer 132 in real time, and outputs the buffer data BFD to the rotation speed decision maker 146 accordingly. The flow detector 144 detects the data flow of the bus 120 in real time and outputs the bus data bit rate IBR to the rotation speed decision maker 146 according to the data flow. The rotation speed decision maker 146 adjusts the disk-rotation-speed signal DSS in real time according to the buffer data BFD and the bus data bit rate IBR, thus avoiding disk recording interruption of the optical storage system 100.

The techniques of this embodiment are further illustrated below in details. When the amount of data in the buffer 132 is not enough or the data flow of the bus 120 drops, the rotation speed of the spindle motor is decreased. When the amount of data in the buffer 132 is excessive large or the data flow of the bus 120 rises, the rotation speed of the spindle motor is increased. Accordingly, due to the difference between the disk recording speed and the data flow of the bus 120, the disk recording interruption caused by lacking of data temporarily stored in the buffer 132 can be avoided.

Figure 2:
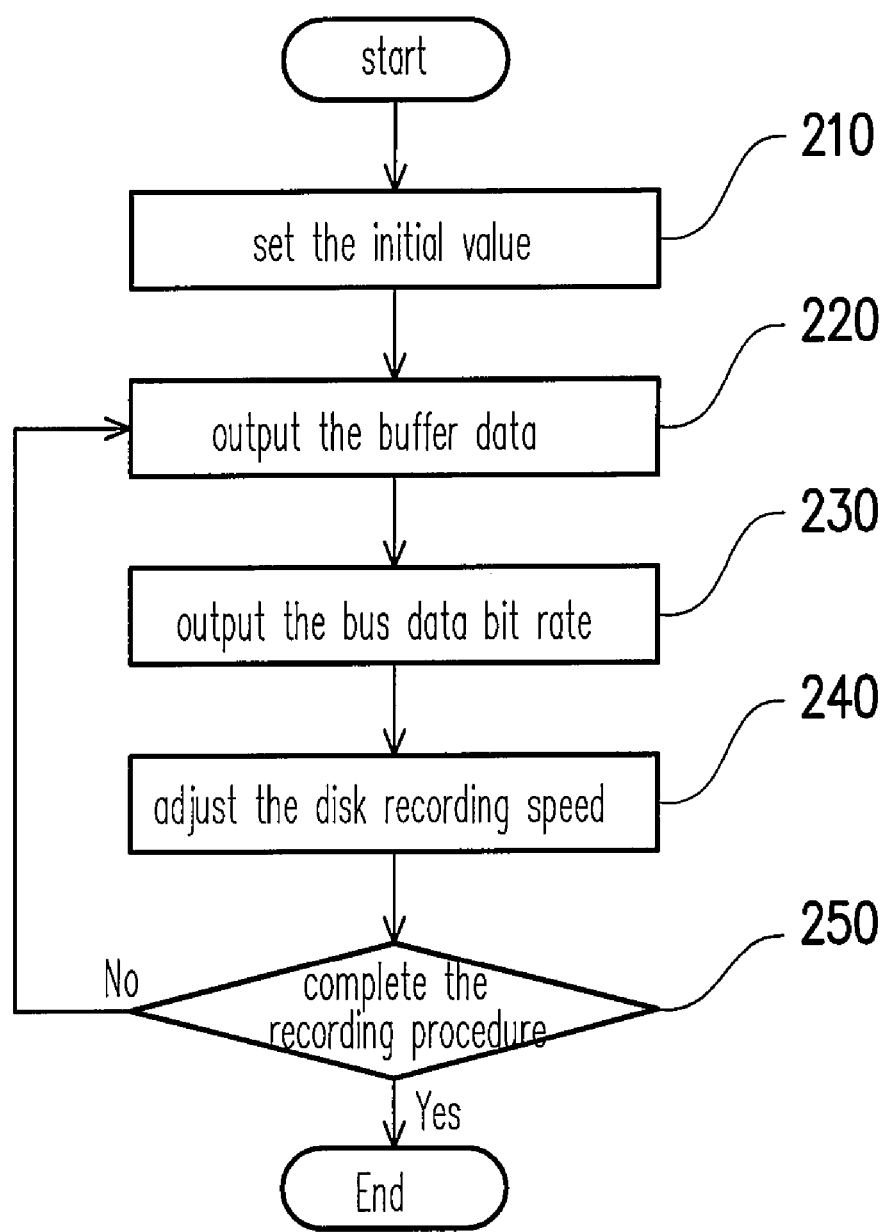
FIG. 2 is a flow chart of a method for controlling the rotation speed of a disk recorder according to another embodiment of the present invention.

FIG. 2 is a flow chart of the method for controlling the rotation speed of a disk recorder according to another embodiment of the present invention. In order to allow those with ordinary skills in the art to understand clearly the technique of the present invention, it is illustrated below in combination with the reference numerals in FIG. 1. First, in Step 210, the rotation speed decision maker 146 obtains the data bit rate DBR of the video encoder 110 via the bus 120 and adjusts the disk-rotation-speed signal DSS according to the data bit rate DBR. Meanwhile, the servo system 136 provides the disk recording speed of the optical storage system 100 with an initial value according to the disk-rotation-speed signal DSS. Next, in Step 220, the buffer monitor 142 outputs the buffer data BFD according to the amount of data in the buffer 132 and the change in the amount of the data. Then, in Step 230, the flow detector 144 outputs the bus data bit rate IBR according to the data flow of the bus 120.

Then, in Step 240, the rotation speed decision maker 146 adjusts the disk-rotation-speed signal DSS according to the buffer data BFD and the bus data bit rate IBR. The servo system 136 adjusts the disk recording speed of the optical storage system 100 according to the disk-rotation-speed signal DSS. Then, in Step 250, if the disk recording procedure is finished, the whole process is completed. If the disk recording procedure has not yet been finished, Step 220 to Step 240 are repeated until the disk recording is finished.

Figure 3:
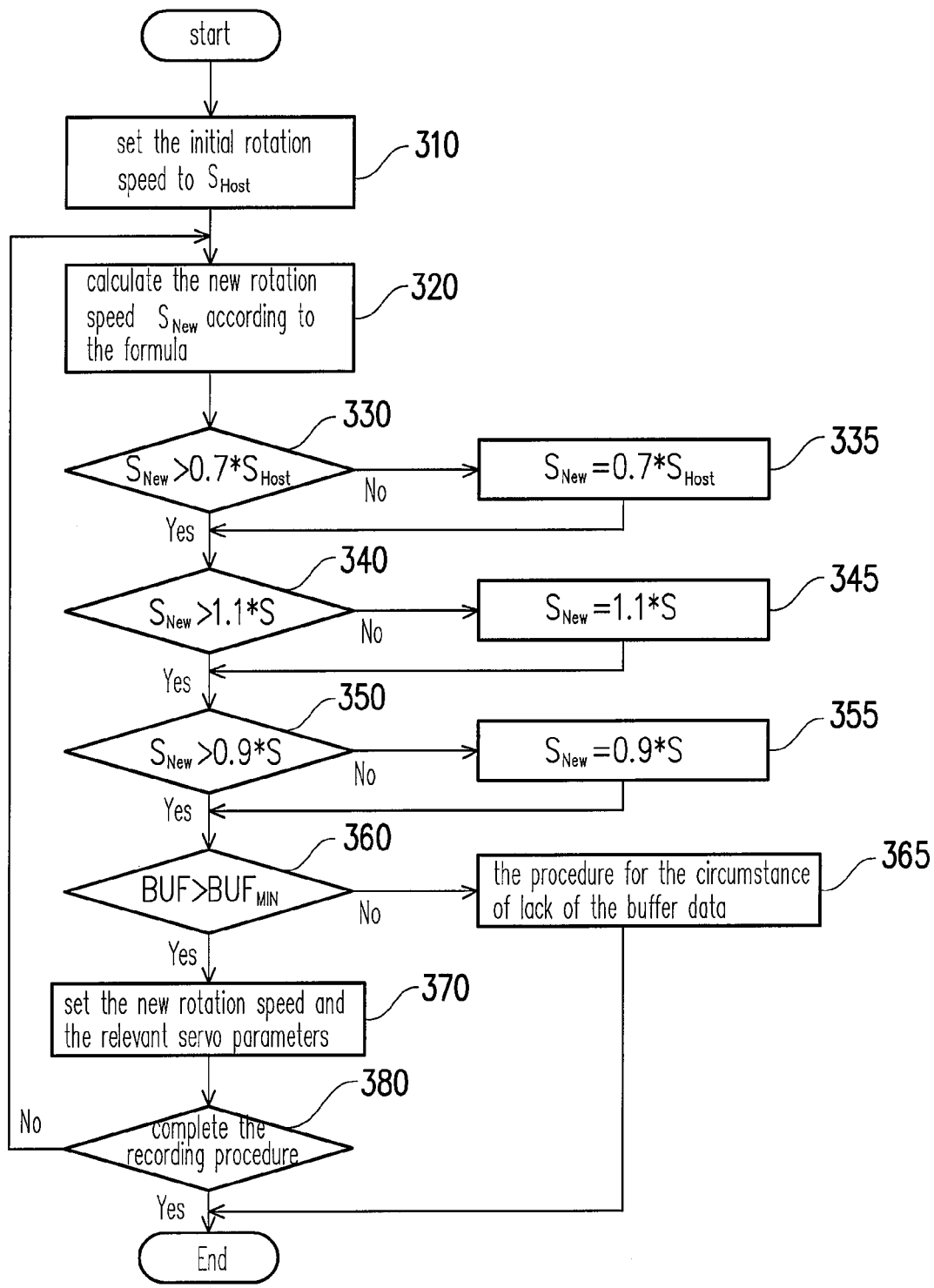
FIG. 3 is a flow chart of the method for controlling the rotation speed of a disk recorder according to another embodiment of the present invention.

In order to make those with ordinary skills in the art clearly understand the technique of the present invention, another embodiment is illustrated below with reference to FIG. 1. FIG. 3 is a flow chart of the method for controlling the rotation speed of the disk recorder according to another embodiment of the present invention. First, in Step 310, the rotation speed decision maker 146 adjusts the disk-rotation-speed signal DSS according to the data bit rate DBR generated by the video encoder 110. The servo system 136 provides the spindle motor of the optical storage system 100 with an initial rotation speed $S_{HOST}$ according to the disk-rotation-speed signal DSS at this time, wherein the rotation speed of the spindle motor corresponds to the disk recording speed of the optical storage system 100. The initial rotation speed $S_{HOST}$ is equivalent to provide the disk recording speed of the optical storage system 100 with an initial value.

Next, in Step 320, the rotation speed decision maker 146 adjusts the disk-rotation-speed signal DSS according to the buffer data BFD and the bus data bit rate IBR. According to the disk-rotation-speed signal DSS, the servo system 136 obtains a new rotation speed $S_{NEW}$ of the spindle motor. In this embodiment, the relationship of the new rotation speed $S_{NEW}$, the buffer data BFD, and the bus data bit rate IBR is shown in the following mathematical expression. The buffer data BFD includes the amount of data BUF in the buffer.

$$S_{NEW}=S+A*(S-S_{IDE})+B*(BUF-0.5*BUF_{MAX})+C*\Delta BUF,$$

$S_{NEW}$: new rotation speed;
S: current rotation speed;
$S_{IDE}$: rotation speed value corresponding to the bus data bit rate;
BUF: amount of data in buffer;
$\Delta BUF$: change in the amount of data in the buffer;
$BUF_{MAX}$: maximum capacity of the buffer.

A, B, and C are weights for each parameter and are determined depending upon the sampling frequency of the flow detector 144, the buffer capacity, the sampling frequency of the buffer monitor 142, and the parameters related to the servo system 136. The parameters can be appropriately adjusted according to different optical storage systems 100.

Then, in Step 330, the obtained new rotation speed $S_{NEW}$ is determine to be within a rational range or not, so as to prevent the recording quality from being influenced by the over change of the rotation speed. In this embodiment, the initial rotation speed $S_{HOST}$ is taken as a standard, and if the new rotation speed $S_{NEW}$ is lower than 0.7 times of the initial rotation speed $S_{HOST}$, the new rotation speed $S_{NEW}$ is adjusted to 0.7 times of the initial rotation speed $S_{HOST}$ in Step 335. Then, in order to avoid abrupt dramatic change of the disk recording speed, the value changed for each time is limited between 0.9 times and 1.1 times of the current rotation speed S in this embodiment.

In Step 340, it is determined whether the difference between the new rotation speed $S_{NEW}$ and the current rotation speed S is rather significant. If the new rotation speed $S_{NEW}$ is higher than 1.1 times of the current rotation speed S, the new rotation speed $S_{NEW}$ is adjusted to 1.1 times of the current rotation speed S in Step 345. Then, in Step 350, it is determined whether the new rotation speed $S_{NEW}$ is lower than 0.9 times of the current rotation speed S. If it is, the new rotation speed $S_{NEW}$ is adjusted to 0.9 times of the current rotation speed S in Step 355. After an appropriate new rotation speed $S_{NEW}$ is obtained, it is determined whether the amount of data in the buffer 132 BUF is sufficient or not in Step 360. If it is not, it indicates that the amount of data in the buffer 132 BUF is smaller than the minimum amount of data $BUF_{MIN}$, and then it moves to the procedure for the circumstance of lack of the buffer data (such as interrupting the disk recording) in Step 365. In another embodiment, the sequence of the determination process in Step 360 can be changed (such as before Step 320) according to the requirements of the user without influencing the efficacy of the present invention. The sequence of Step 340 and Step 350 also can be changed, and the efficacy of the present invention is still achieved.

If the amount of data in the buffer 132 BUF is sufficient, it moves to Step 370, wherein the servo system 136 sets the new rotation speed $S_{NEW}$ of the spindle motor and the relevant parameters of the servo system 136, so as to adjust the disk recording speed of the optical storage system 100. Then, in Step 380, if disk recording has not yet been finished, repeat Step 320 to Step 370. The amount of data BUF in the buffer 132 and the data flow of the bus 120 are monitored in real time to adjust the disk recording speed of the optical storage system 100, and thereby avoiding disk recording interruption caused by lack of data in the buffer 132.

To sum up, by comparing the architecture of FIG. 1A with that of FIG. 1B, the difference between the present embodiment and the conventional art may easily be seen. In this embodiment, the rotation speed control apparatus 140 with the function of monitoring and adjusting the disk recording speed in real time is newly-added to the optical storage system, which is obviously different from the conventional art with a fixed disk recording speed.

Moreover, the disk recording speed is controlled in the present invention through adjusting the rotation speed of the spindle motor, so as to avoid disk recording interruptions due to lack of data in the buffer. Meanwhile, through monitoring the data flow of the bus and the change in the amount of data in the buffer, the disk recording speed is adjusted in real time, such that the likelihood of disk recording interruption is reduced, and thereby the disk recording quality of the optical storage system is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rotation speed control apparatus for a disk recorder, suitable for adjusting disk recording speed of an optical storage system, wherein the optical storage system comprises a buffer and a servo system, the rotation speed control apparatus comprising:

a buffer monitor, coupled to the buffer, for outputting a buffer data according to the amount of data in the buffer; and a rotation speed decision maker, coupled between the buffer monitor and the servo system, for outputting a disk-rotation-speed signal according to the buffer data, wherein the servo system adjusts rotation speed of a spindle motor which is in charge of the rotation of a disk in the optical storage system so as to adjust the disk recording speed of the optical storage system according to the disk-rotation-speed signal, wherein the spindle motor has an initial rotation speed, and the adjusted rotation speed of the spindle motor is defined as a new rotation speed;

wherein when the new rotation speed is lower than a first non-integer times of the initial rotation speed, the new rotation speed is adjusted to the first non-integer times of the initial rotation speed by the rotation speed decision maker;

wherein after the new rotation speed is adjusted to the first non-integer times of the initial rotation speed by the rotation speed decision maker, a variation of the rotation speed of the spindle motor adjusted each time by the rotation speed decision maker is limited between a second non-integer times and a third non-integer times of a current rotation speed of the spindle motor; and wherein a value of the third non-integer is greater than a value of the second non-integer, and a value of the second non-integer is greater than a value of the first non-integer.

2. The rotation speed control apparatus for the disk recorder as claimed in claim 1, wherein the buffer monitor further adjusts the buffer data according to the change of the amount of data in the buffer.

3. The rotation speed control apparatus for the disk recorder as claimed in claim 1, wherein the optical storage system further comprises a bus for transmitting a data to the buffer, the rotation speed control apparatus further comprises:

a flow detector, coupled between the bus and the rotation speed decision maker, for outputting a bus data bit rate to the rotation speed decision maker according to data transmission speed of the bus, wherein the rotation speed decision maker adjusts the disk-rotation-speed signal according to the bus data bit rate.

4. The rotation speed control apparatus for the disk recorder as claimed in claim 3, wherein the optical storage system further comprises a video encoder; the bus is coupled to the video encoder and transmits a data bit rate to the rotation speed decision maker according to setting values from the video encoder; the rotation speed decision maker adjusts the disk-rotation-speed signal according to the data bit rate; and the servo system provides the spindle motor with the initial rotation speed so as to provide the disk recording speed of the optical storage system with an initial value according to the disk-rotation-speed signal.

5. The rotation speed control apparatus for the disk recorder as claimed in claim 1, wherein the optical storage system further comprises:

a bus, for transmitting a data to the buffer; and a video encoder; the bus is coupled to the video encoder and transmits a data bit rate to the rotation speed decision maker according to setting values for the video encoder; the rotation speed decision maker adjusts the disk-rotation-speed signal according to the data bit rate; and the servo system provides the spindle motor with the initial rotation speed so as to provide the disk recording speed of the optical storage system with an initial value according to the disk-rotation-speed signal.

6. The rotation speed control apparatus for the disk recorder as claimed in claim 5, wherein the bus comprises an Advanced Technology attachment packet interface.

7. A rotation speed control apparatus for the disk recorder, suitable for adjusting the disk recording speed of an optical storage system, wherein the optical storage system comprises a bus and a servo system, the rotation speed control apparatus comprising:

a flow detector, coupled to the bus, for outputting a bus data bit rate according to the data transmission speed of the bus; and a rotation speed decision maker, coupled between the flow detector and the servo system, for outputting a disk-rotation-speed signal according to the bus data bit rate, wherein the servo system adjusts rotation speed of a spindle motor which is in charge of the rotation of a disk in the optical storage system so as to adjust the disk recording speed according to the disk-rotation-speed signal, wherein the spindle motor has an initial rotation speed, and the adjusted rotation speed of the spindle motor is defined as a new rotation speed;

wherein when the new rotation speed is lower than a first non-integer times of the initial rotation speed, the new rotation speed is adjusted to the first non-integer times of the initial rotation speed by the rotation speed decision maker;

wherein after the new rotation speed is adjusted to the first non-integer times of the initial rotation speed by the rotation speed decision maker, a variation of the rotation speed of the spindle motor adjusted each time by the rotation speed decision maker is limited between a second non-integer times and a third non-integer times of a current rotation speed of the spindle motor; and wherein a value of the third non-integer is greater than a value of the second non-integer, and a value of the second non-integer is greater than a value of the first non-integer.

8. The rotation speed control apparatus for the disk recorder as claimed in claim 7, wherein the optical storage system further comprises a video encoder, the bus is coupled to the video encoder and transmits a data bit rate to the rotation speed decision maker according to setting values of the video encoder, the rotation speed decision maker adjusts the disk-rotation-speed signal according to the data bit rate, and the servo system provides the spindle motor with the initial rotation speed so as to provide the disk recording speed of the optical storage system with an initial value according to the disk-rotation-speed signal.

9. The rotation speed control apparatus for the disk recorder as claimed in claim 8, wherein the bus comprises an Advanced Technology attachment packet interface.

10. A method for controlling a rotation speed of a disk recorder, suitable for adjusting disk recording speed of an optical storage system, wherein the optical storage system comprises a buffer and a servo system, the method comprising:

outputting a buffer data according to the amount of data in the buffer; and outputting a disk-rotation-speed signal according to the buffer data, wherein the servo system adjusts rotation speed of a spindle motor which is in charge of the rotation of a disk in the optical storage system so as to adjust the disk recording speed according to the disk-rotation-speed signal, wherein the spindle motor has an initial rotation speed, and the adjusted rotation speed of the spindle motor is defined as a new rotation speed;

wherein when the new rotation speed is lower than a first non-integer times of the initial rotation speed, the new rotation speed is adjusted to the first non-integer times of the initial rotation speed;

wherein after the new rotation speed is adjusted to the first non-integer times of the initial rotation speed, a variation of the adjusted rotation speed of the spindle motor for each time is limited between a second non-integer times and a third non-integer times of a current rotation speed of the spindle motor; and wherein a value of the third non-integer is greater than a value of the second non-integer, and a value of the second non-integer is greater than a value of the first non-integer.

11. The method for controlling the rotation speed of the disk recorder as claimed in claim 10, wherein the step of outputting the buffer data further comprises:

adjusting the buffer data according to change of the amount of data in the buffer.

12. The method for controlling the rotation speed of the disk recorder as claimed in claim 10, wherein the optical storage system further comprises a bus for transmitting a data to the buffer, and the method further comprises:

outputting a bus data bit rate according to the data transmission speed of the bus; and adjusting the disk-rotation-speed signal according to the bus data bit rate.

13. The method for controlling the rotation speed of the disk recorder as claimed in claim 12, wherein the optical storage system further comprises a video encoder, and the method further comprises:

outputting a data bit rate according to setting values from the video encoder; and adjusting the disk-rotation-speed signal according to the data bit rate, and thus the servo system provides the spindle motor with the initial rotation speed so as to provide the disk recording speed of the optical storage system with an initial value according to the disk-rotation-speed signal.

14. The method for controlling the rotation speed of the disk recorder as claimed in claim 10, wherein the optical storage system further comprises a video encoder, and the method further comprises:

outputting a data bit rate according to setting values of the video encoder; and adjusting the disk-rotation-speed signal according to the data bit rate, and thus the servo system provides the spindle motor with the initial rotation speed so as to provide the disk recording speed of the optical storage system with an initial value according to the disk-rotation-speed signal.

15. A method for controlling the rotation speed of a disk recorder, suitable for adjusting disk recording speed of an optical storage system, wherein the optical storage system comprises a bus and a servo system, the method comprising:

outputting a bus data bit rate according to the data transmission speed of the bus; and outputting a disk-rotation-speed signal according to the bus data bit rate, wherein the servo system adjusts rotation speed of a spindle motor which is in charge of the rotation of a disk in the optical storage system so as to adjust the disk recording speed according to the disk-rotation-speed signal, wherein the spindle motor has an initial rotation speed, and the adjusted rotation speed of the spindle motor is defined as a new rotation speed;

wherein when the new rotation speed is lower than a first non-integer times of the initial rotation speed, the new rotation speed is adjusted to the first non-integer times of the initial rotation speed;

wherein after the new rotation speed is adjusted to the first non-integer times of the initial rotation speed, a variation of the adjusted rotation speed of the spindle motor for each time is limited between a second non-integer times and a third non-integer times of a current rotation speed of the spindle motor; and wherein a value of the third non-integer is greater than a value of the second non-integer, and a value of the second non-integer is greater than a value of the first non-integer.

16. The method for controlling the rotation speed of the disk recorder as claimed in claim 15, wherein the optical storage system further comprises a video encoder, and the method further comprises:

outputting a data bit rate according to setting values of the video encoder; and adjusting the disk-rotation-speed signal according to the data bit rate, and thus the servo system provides the spindle motor with the initial rotation speed so as to provide the disk recording speed of the optical storage system with an initial value according to the disk-rotation-speed signal.

* * * * *